United States Patent [19]

Palmer et al.

[11] Patent Number: 5,595,435
[45] Date of Patent: Jan. 21, 1997

[54] FLASHLIGHT ILLUMINATOR FOR A NIGHT VISION DEVICE

[75] Inventors: Gary L. Palmer, Roanoke; William K. Forsythe, Blueridge, both of Va.

[73] Assignee: ITT Corporation, New York, N.Y.

[21] Appl. No.: 398,346

[22] Filed: Mar. 3, 1995

[51] Int. Cl.⁶ .................................................. F21V 33/00
[52] U.S. Cl. ........................ 362/109; 362/187; 362/277
[58] Field of Search .................................. 362/109, 187, 362/277

[56] References Cited

U.S. PATENT DOCUMENTS

| | | | |
|---|---|---|---|
| Re. 15,022 | 1/1921 | Burgess | 362/187 |
| 4,707,595 | 11/1987 | Meyers | 250/504 R |
| 4,853,529 | 8/1989 | Meyers | 250/213 VT |
| 4,916,579 | 4/1990 | Simms | 362/187 |
| 4,948,210 | 8/1990 | Simms | 362/277 |
| 4,991,183 | 2/1991 | Meyers | 372/100 |
| 5,042,048 | 8/1991 | Meyer | 362/109 |

*Primary Examiner*—Ira S. Lazarus
*Assistant Examiner*—Alfred Basichas
*Attorney, Agent, or Firm*—Plevy & Associates; Patrick M. Hogan

[57] ABSTRACT

An illuminator device for a night vision apparatus, the illuminator device providing supplemental illumination of remotely located objects to be viewed through the night vision apparatus under a low light condition. The illuminator device comprises a housing, light source coupled to one end of the housing for generating a light to illuminate the remotely located objects. The illuminator device further comprises focusing lens for condensing the light generated by the light source into a concentrated light beam having a pattern of consistent brightness which enables substantially long range illumination. The focusing lens is located a given distance away from the light source in a location which is remote from the end of the housing.

18 Claims, 5 Drawing Sheets

FLASHLIGHT ILLUMINATOR FOR A NIGHT VISION DEVICE

FIELD OF THE INVENTION

The present invention relates generally to flashlight illuminator devices typically employed in conjunction with night vision devices and more particularly to a flash light illuminator device having a movable lens assembly which operates as a light beam condenser.

BACKGROUND OF THE INVENTION

Electro-optical devices which enable people such as soldiers, aviators, sailors, and sportsman to view objects at night and in other low light conditions are commonly referred to as night vision devices. Night vision devices were originally developed for military applications. However, night vision devices are now being marketed to the general public. Commercially available night vision devices are becoming quite common for use in activities that take place in low light conditions. Such activities include night marine piloting, underwater vision, night security surveillance, hunting, fishing, and navigation.

Examples of some commercially available night vision devices and the technology associated therewith are described in U.S. Pat. No. 08/152,193 entitled MONOCULAR NIGHT VISION DEVICE filed on Nov. 13, 1993 and U.S. Pat. No. Des. 29/014,252 entitled NIGHT VISION MONOCULAR filed on Oct. 15, 1993, both applications being assigned to the ITT Corporation the assignee herein. Each of these applications relate to monocular night vision devices.

Other types of commercial night vision devices are described in U.S. patent application Ser. No. 08/108,989 entitled NIGHT VISION BINOCULARS filed on Aug. 18, 1993 and U.S. patent application Ser. No. 07/954,006 entitled CONSUMER NIGHT VISION APPARATUS filed on Sep. 30, 1992. Both of these applications are assigned to the ITT Corporation the assignee herein.

Most night vision devices utilize an image intensifier that receives very small quantities of both visible light and non-visible near infrared light reflected off objects on the ground and amplifies these very small quantities of light into a clearly visible light. The visible and non-visible near infrared light reflected by these objects originate from the light radiated by the moon and stars of the night sky. In most situations, the night sky provides sufficient quantities of light for the night vision device to operate effectively. However, there are many situations particularly, during the dead of night when there are insufficient quantities of visible and near infrared light available to effectively operate the night vision device.

The prior art has responded to this problem by providing flashlight-like devices which illuminate the objects to be view with a beam of non-visible near infrared light. Accordingly, the light energy reflected from the object will be visible through the night vision device although it will not be visible to the naked eye.

In order to free-up the user's hands for other activities, these prior art illuminator devices are usually attached to the night vision device. An example of such an arrangement is described in U.S. patent application Ser. No. 08/215,512 filed on Mar. 22, 1994 entitled ILLUMINATOR BRACKET FOR A NIGHT VISION DEVICE, assigned to ITT Corporation the assignee herein.

A typical prior art flashlight illuminator device employs a conical-shaped reflector oriented behind the light source to provide a forward focused pattern of light around the target object. The light pattern provided by such an arrangement is usually uneven in brightness with on and off-axis bright spots. The uneven brightness and on and off-axis bright spots are caused by imperfections in the surface of the reflector. Inconsistent light patterns are lower in overall light intensity which hampers the identification of the target object to be viewed with the night vision device.

It is, therefore, a primary object of the present invention to provide an improved night vision flashlight illuminator device which provides a much brighter and evenly focused light beam pattern.

It is another object of the present invention to provide a night vision flashlight illuminator device which allows continuously variable beam diameters from spot to wide angle.

SUMMARY OF THE INVENTION

An illuminator device for a night vision apparatus, the illuminator device providing supplemental illumination of remotely located objects to be viewed through the night vision apparatus under a low light condition.

The illuminator device comprises housing means, light source means coupled to one end of the housing means for generating a light to illuminate the remotely located objects. The illuminator device further comprises focusing means for condensing the light generated by the light source means into a concentrated light beam having a pattern of consistent brightness which enables substantially long range illumination.

The focusing means is located a given distance away from the light source means in a location which is remote from the end of the housing means.

BRIEF DESCRIPTION OF THE DRAWINGS

The above and other features and aspects of the present invention will become more apparent upon reading the following detail description in conjunction with the accompanying drawings, in which.

DETAILED DESCRIPTION OF THE INVENTION

Figure 1:
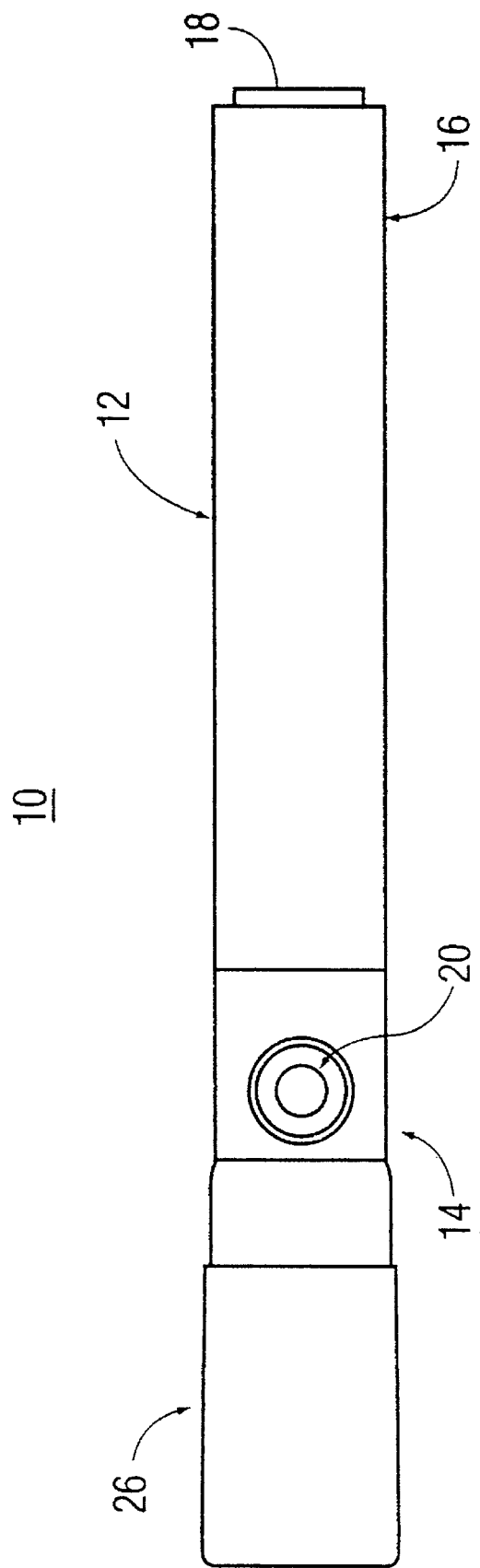
FIG. 1 is an elevational view of the flashlight illuminator according to a preferred embodiment of the invention.

Referring to FIG. 1, there is shown a preferred embodiment of the flashlight illuminator of the present invention designated by the numeral 10. The flashlight illuminator device 10 of the present invention has a modular construction which provides relatively inexpensive component costs and makes the device easy to assemble. The flashlight illuminator 10 includes a cylindrical-shaped battery housing 12 having a front section 14 and a rear section 16 which is constructed in a substantially conventional manner. Attached to the front section 14 of the battery housing 12 is a novel sliding zoom assembly 26 that operates to provide continuously variable beam diameters from spot size to wide angle. More importantly, however, the sliding zoom assembly 26 also operates to concentrate light in a tight bundle thereby allowing a longer range of illumination. The sliding zoom assembly 26 of the present invention employs a relatively inexpensive beam condenser (not visible) which eliminates the reflector used in convention flashlight illuminators and the disadvantages associated therewith.

At the rear section 16 of the battery housing 12 is a removably engaged end cap 18. The end cap 18 provides access to the interior of the housing where a battery or series of batteries, which powers the illuminator, are housed. Suitable springs or the like (not shown) may be provided to ensure contact of the terminals of the battery. A switch 20 is provided for connecting the batteries to a light source. The switch is a spring operated pushbutton ON/OFF mechanism or other similar type switch for activating and deactivating the illuminator 10.

Figure 2A:
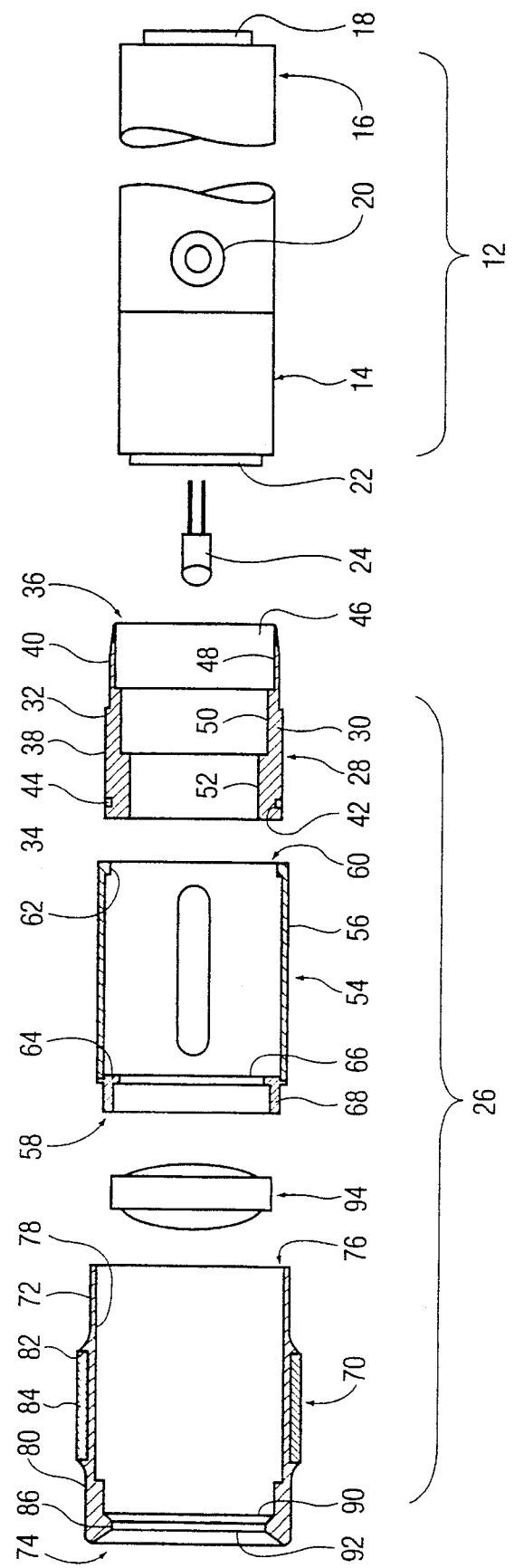
FIG. 2A is an exploded view of the flashlight illuminator of FIG. 1 showing the sliding zoom assembly in cross section.
Figure 2B:
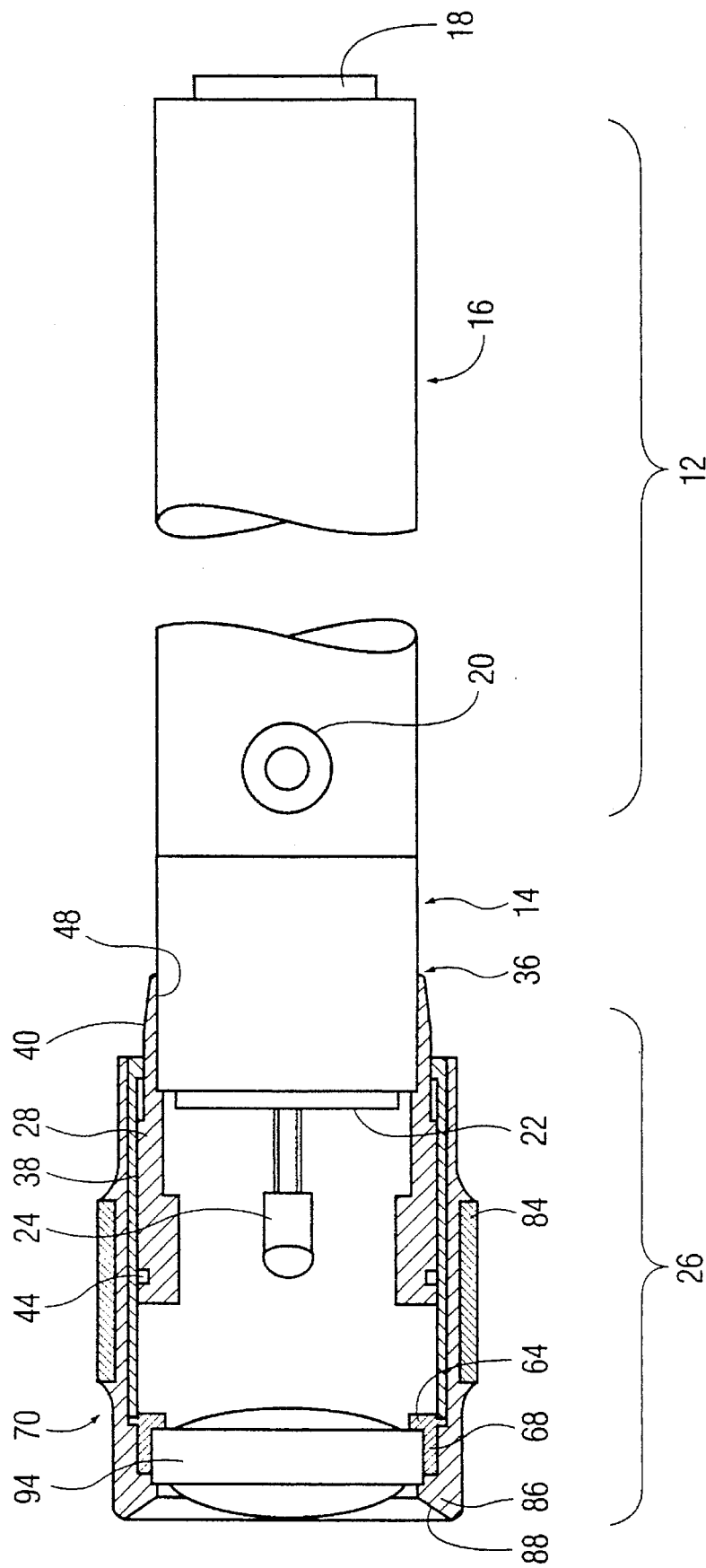
FIG. 2B is another view of the flashlight illuminator of FIG. 1 showing the sliding zoom assembly in cross section.
Figure 3A:
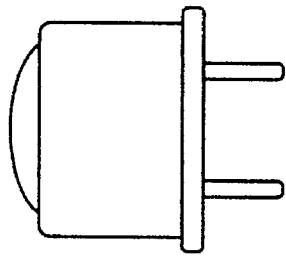
FIG. 3A is an elevational view of a plug-in type LED light source.
Figure 3B:
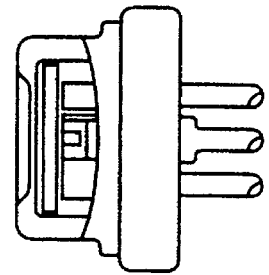
FIG. 3B is an elevational view of a plug-in type LASER diode light source.

As shown in FIGS. 2A and 2B which respectively show an exploded view and assembled view of the device of FIG. 1, the end of the front section 14 of the battery housing 12 includes a socket 22 for receiving a plug-in type light source 24. The preferred light sources may include both visible and non-visible light sources. The non-visible light sources are desirable for use in covert operations. Examples of some preferred visible light sources include xenon bulbs (shown in FIGS. 2A and 2B), halogen bulbs, visible LED's, and visible LASER diodes. Examples of some preferred non-visible light sources include infrared light illuminating diodes (shown in FIG. 3A), and IR LASER diodes (shown in FIG. 3B). The aforementioned light sources are preferred because they are relatively inexpensive and readily available from various suppliers. It should be understood, however, that any other suitable well known light sources can be used as well.

Referring still to FIGS. 2A and 2B, the sliding zoom assembly 26 includes an inner barrel 28 which has a cylindrical wall 30 that surrounds the light source 24. The cylindrical wall 30 of the inner barrel 28 defines an outer surface 32 which extends between a first end 34 and a second end 36 of the inner barrel 28. The outer surface 32 includes a large outer diameter portion 38 which steps down to a small outer diameter portion 40 the purpose of which will be explained shortly. An annular groove 42 is defined in the large outer diameter portion 38 of the outer surface 32 of the cylindrical wall 30 adjacent the first end 34 of the inner barrel 28. Seated within the annular groove 42 is an O-ring 44. The inner surface 46 defined by the cylindrical wall 30 of the inner barrel 28 includes a large inner diameter portion 48 which steps down to an intermediate inner diameter portion 50 which steps down to a small inner diameter portion 52. The large inner diameter portion 48 is sized to allow the inner barrel 28 to be attached to the front section 14 of the battery housing 12 in a press-fit manner which eliminates the need for any type of fastener. It should be understood, however, that any other suitable fastening method can be employed to attach the inner barrel 28 to the battery housing 12 if desired.

The inner surfaces 48, 50 and 52 of the inner barrel 28 and the socket portion 22 of the battery housing are colored black to prevent the reflection of light radiated from the light source 24. This is necessary in order to maintain a light pattern of consistent brightness around the target. Any reflections off the inner surfaces of the inner barrel 28 or the socket area 22 can cause on-axis and off-axis hot spots of beam brightness.

An outer barrel 54 having a cylindrical wall 56 which extends between a first end 58 and a second end 60 thereof, is slidably mounted over the inner barrel 28 to provide a telescoping motion with respect to the inner barrel 28. The outer barrel 54 includes an inwardly extending annular retaining bead 62 located at the second end 60 thereof and an inwardly extending annular flange 64 which defines an opening 66 at the first end 58. The retaining bead 62 of the outer barrel 54 is configured to abut against the stepped large outer diameter portion 38 of the inner barrel 28 when the sliding zoom assembly 26 is in the fully extended telescopic position thus, preventing the outer barrel 54 from detaching from the inner barrel 28. The small outer diameter portion 40 of the inner barrel 28 enables the retaining bead 62 of the outer barrel 54 to slide along the cylindrical wall 32 of the inner barrel 28 when it is desirable to fully retract the sliding zoom assembly 26. The annular flange 64 of the outer barrel 54 acts as a stop as it abuts against the first end 34 of the inner barrel 28 when the sliding zoom assembly 26 is fully retracted. The O-ring 44 provided on inner barrel 28 creates a small amount of friction between the inner and outer barrels as the outer barrel 54 slides along the inner barrel 28. This friction operates to lock the position of the outer barrel 54 relative to the inner barrel 28 once the desired beam diameter is chosen. The outer barrel 54 also includes a short annular wall extension 68 which projects from the outer surface of the annular flange 64 the purpose of which will be explained shortly.

A retaining collar 70 having a cylindrical wall 72 with a first end 74 and a second end 76 covers the outer barrel 54. The inner surface 78 of the cylindrical wall 72 is sized to coaxially receive the outer barrel 54 in a press-fit manner although any other suitable fastening method can be employed to secure the lens retaining collar 70 over the outer barrel 54. The outer surface 80 of the retaining collar 70 includes a recess 82 for receiving a rubber-like gripping sleeve 84. The gripping sleeve 84 makes it easier for the user to adjust the sliding zoom assembly 26. The gripping sleeve 84 may include flutes (not shown) or like surface features which facilitate the gripping and adjusting of the sliding zoom assembly 26 by a user.

An inwardly extending flange 86 which defines a opening 92 is disposed at the first end 74 of the retaining collar 70. The outer surface 88 of the flange is concave. The inner surface 90 of the flange 86 is stepped and cooperates with the short annular wall extension 68 and the annular flange 64 of the outer barrel 54 to define a light beam condenser seat. A light beam condenser 94 is seated in the light beam condenser seat.

Figure 4A:
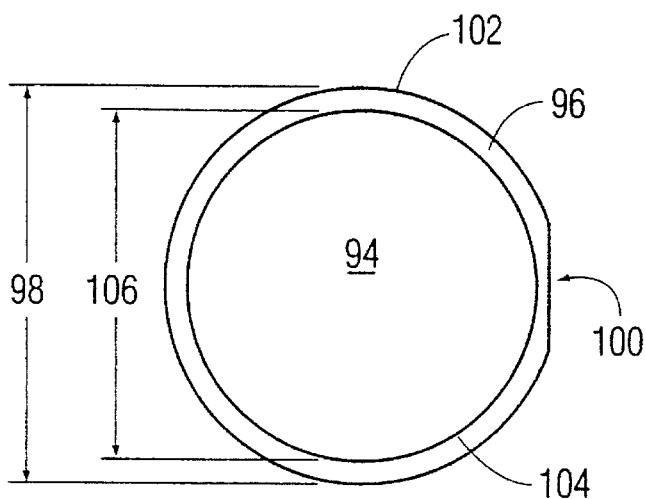
FIG. 4A is an elevational view of the condenser lens.
Figure 4B:
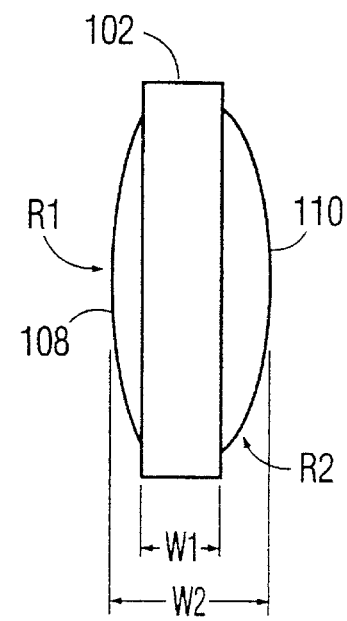
FIG. 4B is a side elevational view of the condenser lens shown in FIG. 4A.

Referring to FIGS. 4A and 4B, the light beam condenser 94 is preferably a clear optical acrylic aspheric lens that provides a very short focal distance and minimizes spherical aberrations in the light beam. As can be seen in FIG. 4A, the lens 94 includes a planar annular seating surface 96 which has a preferred outer diameter 98 of approximately 0.748 inches. A flattened area 100 called a gate or spur is provided on a circumferential seating surface 102 of the lens 94. The gate coacts with an associated flattened area provide on the lens seat (not shown) to properly locate the lens 94 in the sliding zoom assembly 26. The aperture 104 of the lens 94 has a preferred diameter 106 of approximately 0.669 inches.

In FIG. 4B, it can be seen that the lens 94 has two opposing convex spherical surfaces each having a different radius of curvature. The preferred radius of curvature R1 for the light source side 108 of the lens 94 is approximately 0.974 inches. The preferred radius of curvature R2 for the object side 110 of the lens 94 is approximately 0.604 inches. The circumferential seating surface 102 has a preferred width W1 of approximately 0.148 inches. The maximum overall width W2 of the lens 94 is approximately 0.305 inches as measured from the apex of each spherical surface of the lens. The above-described lens 94 provides a very short focal distance and minimizes spherical aberrations in the light beam to provide a light pattern of consistent brightness around the target object.

In operation, the sliding zoom assembly 26 positions the beam condensing lens 94 in front of the light source 24. The beam condensing lens 94 focuses the light emanating from the light source 24 and projects it forward into a highly concentrated beam pattern of light. Since the pattern of light is concentrated into a brighter more consistent beam, longer ranges of illumination are possible with the present invention when compared to the illumination ranges of the prior art devices which employ reflectors.

The distance between the beam condensing lens 94 and the light source 24 can be continuously varied by telescopically retracting or extending the sliding zoom assembly 26. This allows the lens 24 to optically focus the light into a light beam having a continuously variable diameter ranging between a very small diameter spot-like beam to a relatively large diameter wide angle beam.

Figure 5:
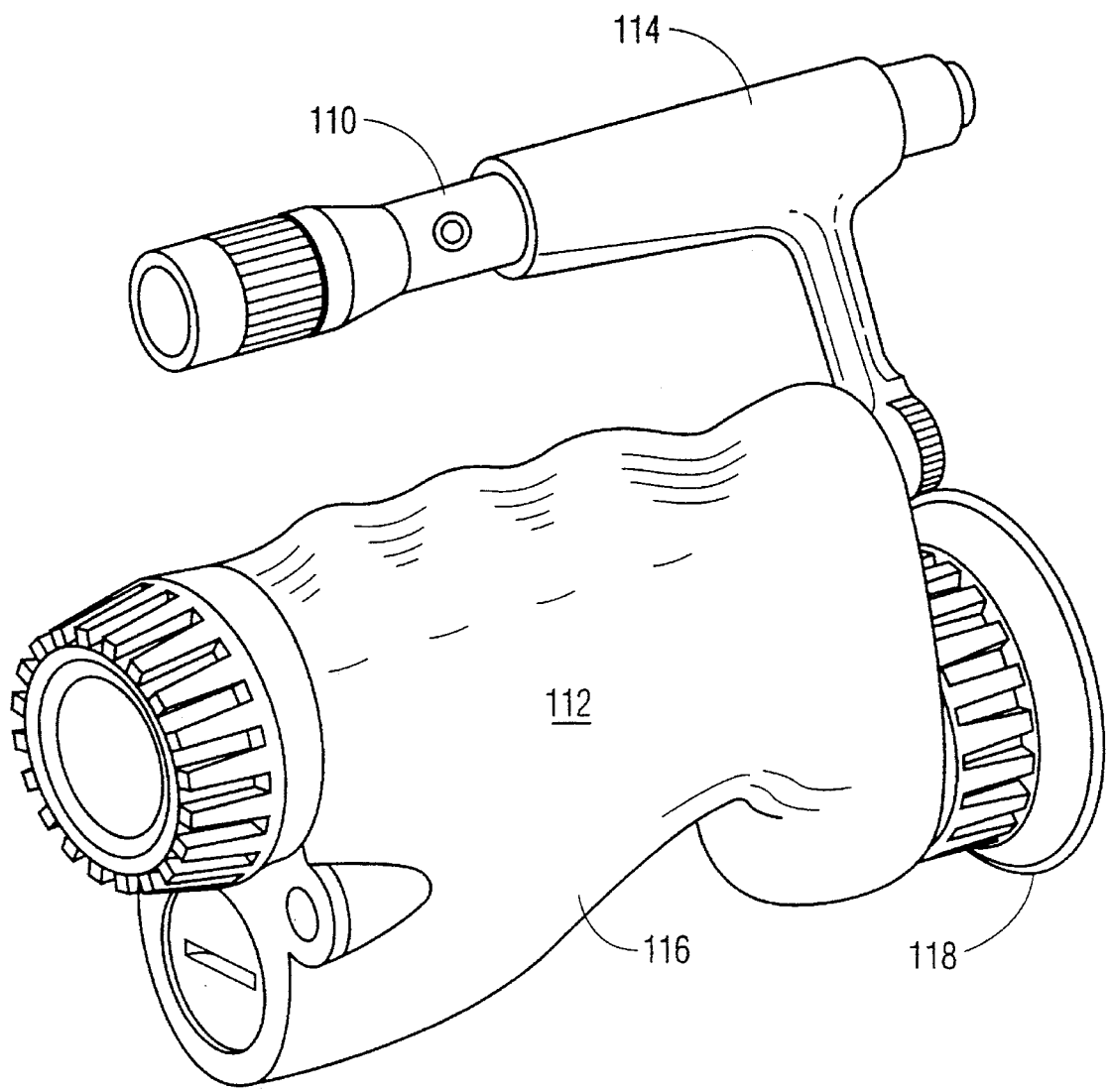
FIG. 5 is a perspective view depicting the flashlight illuminator of the present invention coupled to a night vision device.

Referring now to FIG. 5, the flashlight illuminator 10 of the present invention is shown coupled to a monocular night vision device 112 which employs an image intensifier tube (not shown) which amplifies visible light and non-visible near infrared light. Although the flashlight illuminator 10 of the present invention is shown with a monocular night vision device 112, it should be understood that the flashlight illuminator 10 of the present invention may be used with any other type of night vision device or used by itself as a conventional flashlight if a visible light source is employed.

As shown in FIG. 5, the flashlight illuminator 10 of the present invention is mounted on the monocular night vision device 112 in a support bracket 114. The support bracket 114 is mounted on a rearward portion of the housing 116 of the night vision device 112 above a viewing eyepiece 118 as described in U.S. patent application Ser. No. 08/215,512 filed on Mar. 22, 1994 entitled ILLUMINATOR BRACKET FOR A NIGHT VISION DEVICE, assigned to ITT Corporation the assignee herein, the entire disclosure of which is incorporated herein by reference.

It should be understood that the embodiment described herein is merely exemplary and that a person skilled in the art may make many variations and modifications to the embodiment utilizing functionally equivalent elements to those described herein. Any and all such variations or modifications as well as others which may become apparent to those skilled in the art, are intended to be included within the scope of the invention as defined by the appended claims.

We claim:

1. An illuminator device for a night vision apparatus, said illuminator device providing supplemental illumination of remotely located objects to be viewed through the night vision apparatus under a low light condition, said illuminator device comprising:

housing means having a first end and a second end;

light source means coupled to said first end of said housing means for generating a light to illuminate the remotely located objects; and focusing means for condensing the light generated by said light source means into a concentrated light beam having a pattern of consistent brightness which enables substantially long range illumination, wherein said focusing means is located a given distance away from said light source means in a location which is remote from said first end of said housing means, and wherein said focusing means comprises a single convex aspheric lens, said aspheric lens including opposing first and second spherical surfaces, said first spherical surface having a first radius of curvature and said second spherical surface having a second radius of curvature, said first radius of curvature being substantially different from said second radius of curvature.

2. The illuminator device according to claim 1, further comprising power supply means enclosed in said housing means.

3. The illuminator device according to claim 1, further comprising telescoping means coupled to said first end of said housing means, for housing said focusing means, said telescoping means operating to vary said given distance between said focusing means and said light source means to provide a variable diameter light beam.

4. The illuminator device according to claim 1, further comprising illuminator activation means located on said housing means for selectively coupling and uncoupling said power supply means to said light source means.

5. The illuminator device according to claim 1, wherein said light source means generates a visible light and is selected from the group consisting of xenon bulbs, halogen bulbs and light emitting diodes.

6. The illuminator device according to claim 1, wherein said light source means generates a non-visible near infrared light.

7. The illuminator device according to claim 1, wherein said focusing means comprises a single convex aspheric lens for providing a substantially short focal distance and substantially minimizing spherical aberrations in said light beam.

8. The illuminator device according to claim 7, wherein said aspheric lens is made from plastic.

9. The illuminator device according to claim 1, wherein said first radius of curvature is approximately 0.604 inches and said second radius of curvature is approximately 0.974 inches.

10. In a flashlight illuminator device of the type used for providing supplemental illumination of remotely located objects to be viewed through a night vision apparatus under a low light condition, said flashlight illuminator device comprising a housing having a first end and a second end, a power supply enclosed in said housing, a light source positioned in said first end of said housing for generating a light to illuminate the remotely located objects, and an on/off switch for selectively coupling and uncoupling said light source to said power supply, the improvement therewith comprising:

focusing means for concentrating the light generated by said light source into a concentrated light beam having a pattern of consistent brightness which enables substantially long range illumination, wherein said focusing means is located a given distance away from said light source in a location which is remote from said first end of said housing, and wherein said focusing means comprises a single convex aspheric lens, said aspheric lens including opposing first and second spherical surfaces, said first spherical surface having a first radius of curvature and said second spherical surface having a second radius of curvature, said first radius of curvature being substantially different from said second radius of curvature.

11. The flashlight illuminator device according to claim 10, further comprising telescoping means coupled to said first end of said housing, for housing said focusing means, said telescoping means operating to vary said given distance between said focusing means and said light source to provide a variable diameter light beam.

12. The illuminator device according to claim 10, wherein said light source means generates a visible light and is selected from the group consisting of xenon bulbs, halogen bulbs and light emitting diodes.

13. The illuminator device according to claim 10, wherein said light source means generates a non-visible near infrared light and is selected from a group consisting of infrared light illuminating diodes and infrared LASER diodes.

14. The illuminator device according to claim 10, wherein said focusing means comprises a single convex aspheric lens for providing a substantially short focal distance and substantially minimizing spherical aberrations in said light beam.

15. The illuminator device according to claim 14, wherein said aspheric lens is made from plastic.

16. The illuminator device according to claim 1, wherein said first radius of curvature is approximately 0.604 inches and said second radius of curvature is approximately 0.974 inches.

17. An apparatus for viewing remotely located object under a low light condition, comprising:

a night vision device having image intensifier means for amplifying visible and near infrared light reflected from the remotely located objects to be viewed; and a flashlight illuminator device removably attached to said night vision device for providing supplemental illumination of the remotely located objects to be viewed through the night vision device, said illuminator device comprising housing means having a first end and a second end, light source means coupled to said first end of said housing means for generating a light to illuminate the remotely located object, and a focusing means for condensing the light generated by said light source means into a concentrated light beam having a pattern of consistent brightness which enables substantially long range illumination, wherein said focusing means is located a given distance away from said light source means in a location which is remote from said first end of said housing means, and wherein said focusing means comprises a single convex aspheric lens, said aspheric lens including opposing first and second spherical surfaces, said first spherical surface having a first radius of curvature and said second spherical surface having a second radius of curvature, said first radius of curvature being substantially different from said second radius of curvature.

18. The apparatus according to claim 17, further comprising telescoping means coupled to said first end of said housing means, for housing said focusing means, said telescoping means operating to vary said given distance between said focusing means and said light source means to provide a variable diameter light beam.

* * * * *